April 17, 1951   J. W. J. ACKERMANS   2,549,153
FOLDING TOP FOR AUTOMOBILES
Filed May 1, 1946   3 Sheets-Sheet 3

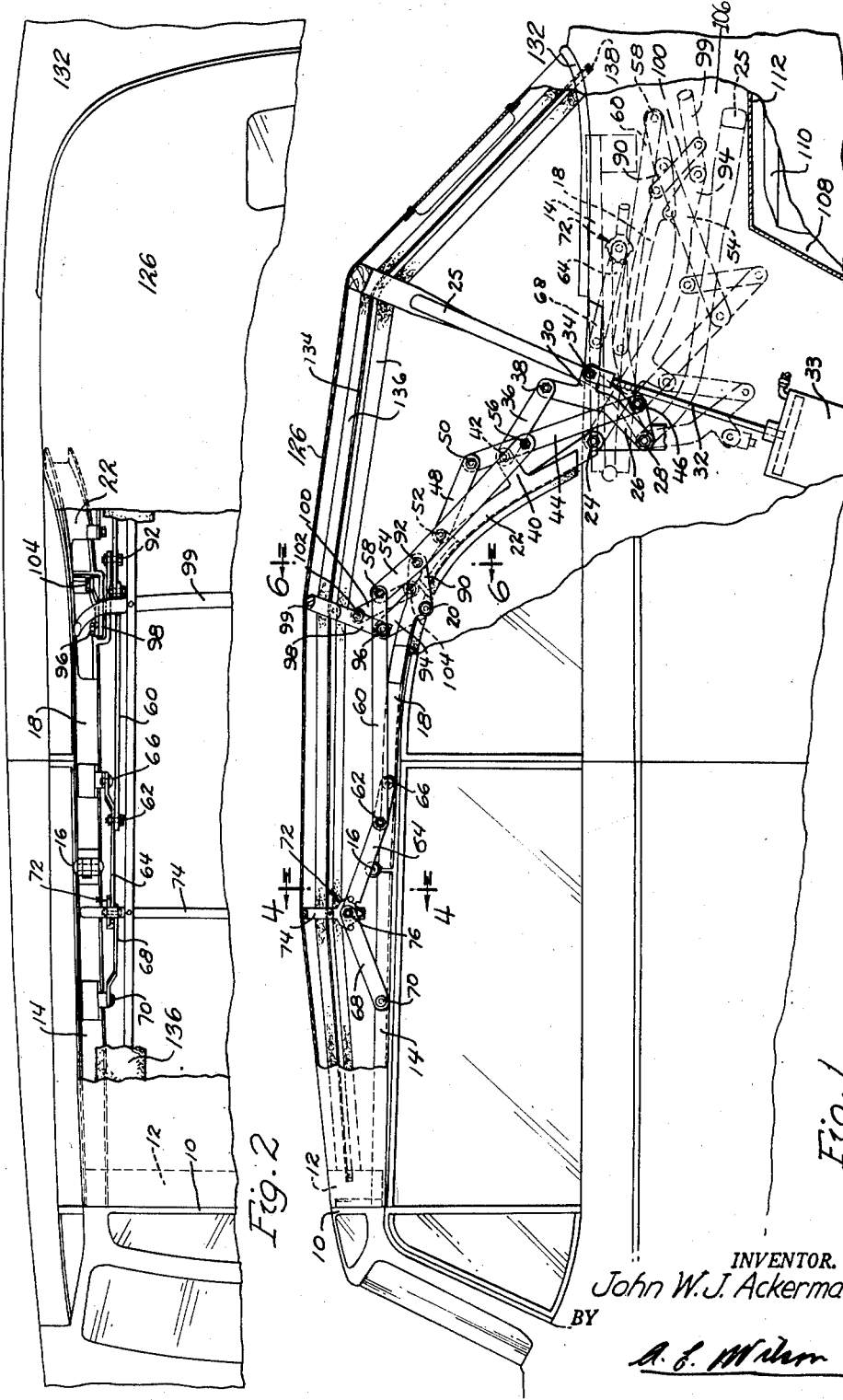

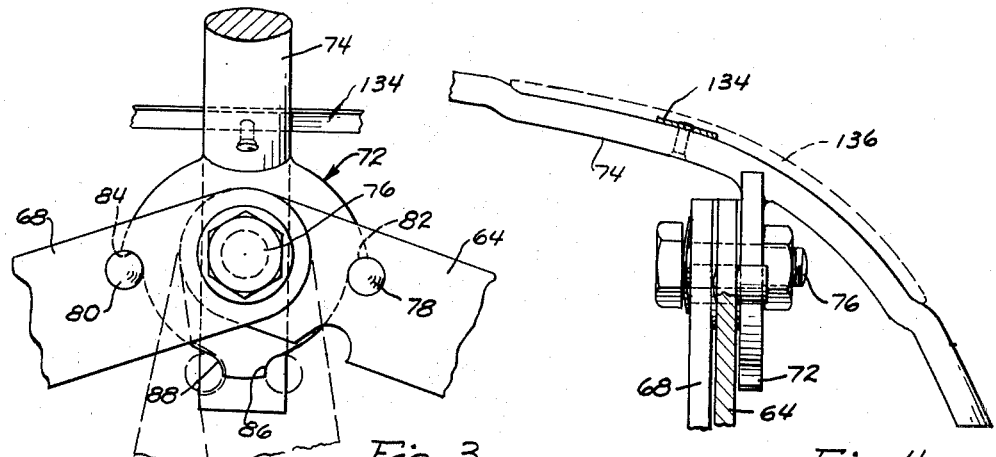
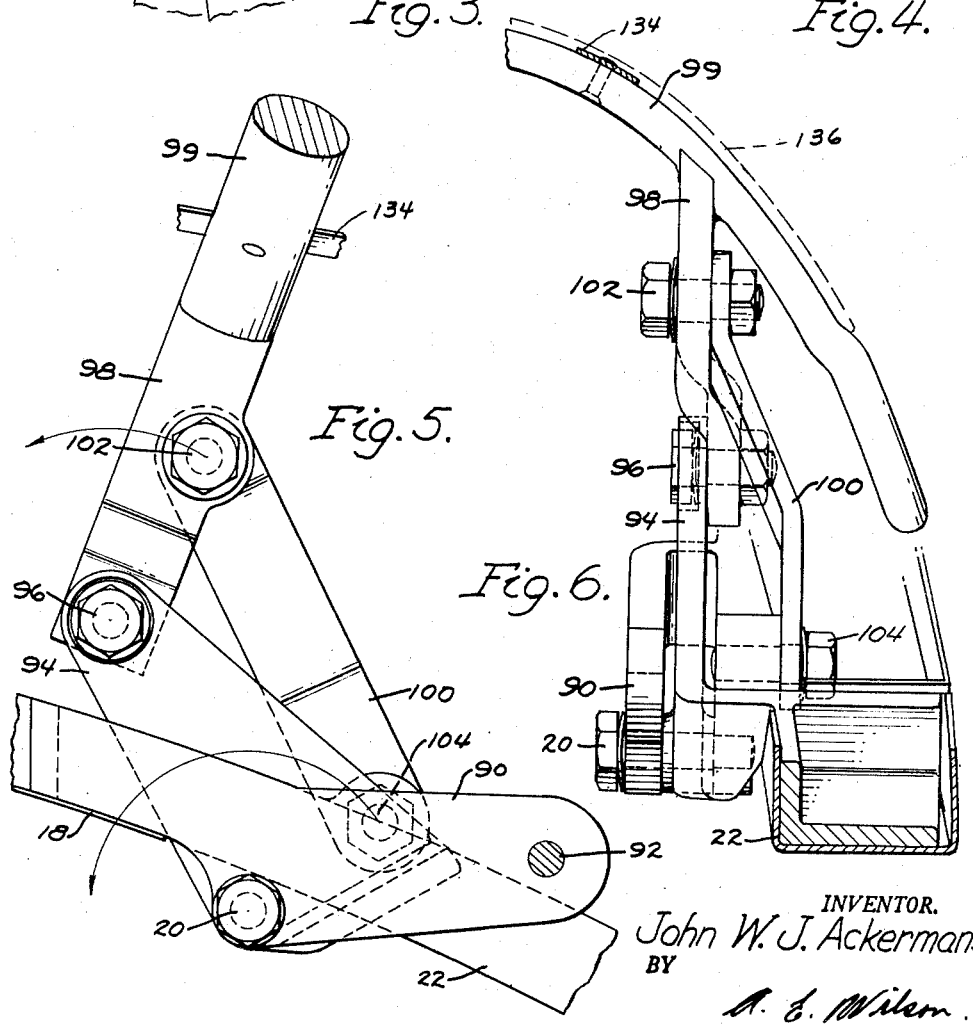

INVENTOR.
John W. J. Ackermans
BY
A. C. Wilson
ATTORNEY.

Patented Apr. 17, 1951

2,549,153

UNITED STATES PATENT OFFICE 2,549,153

FOLDING TOP FOR AUTOMOBILES

John W. J. Ackermans, Detroit, Mich.

Application May 1, 1946, Serial No. 666,413

18 Claims. (Cl. 296—107)

This invention relates to collapsible tops for motor vehicles, and more particularly to an improved top construction so designed as to provide maximum seating capacity, spare wheel and luggage space, and a smaller top booth inside the vehicle to provide minimum interference when the top is moved to the collapsed position.

A great deal of effort has been devoted to the design of collapsible tops, but the tops heretofore developed have possessed inherent disadvantages in that they have been cumbersome to operate and did not possess any readily operable positive means for locking some of the top bows in predetermined up or down positions to provide a rigid construction that would withstand the vibration and shock loads to which tops are subjected in use, and prevent rattle of the actuating means.

An object of this invention is to provide a collapsible top designed to provide minimum interference when in the folded position, and embodying mechanism to securely hold the top bows when in the up position in such a manner that vibration and shock loads to which the top is subjected will not loosen the top or cause it to rattle.

An important object of this invention is to permit the folding top to nestle in a shallower space or booth above a shelf under which the spare wheel may be stored in such a manner that when the top is down it is substantially flush with the general lines of the upper body contour of the vehicle.

A further object of the invention is to provide an improved folding top so designed as to provide maximum seating capacity particularly in the rear seat, a relatively short and narrow space being provided behind and at the sides of the rear seat to form a booth or compartment for the reception of the top when in the folded or collapsed position.

Yet a still further object of this invention is to provide novel flexible tension members to maintain the foldable portion of the top taut in such a manner that wrinkles are not permitted to form in the top when it is in the elevated or up position, and to maintain the plurality of bows and other top supporting linkage under tension in the up position by securing the tension members to the plurality of bows and linking and anchoring the lower rear end of the tension members to a rigid portion of the body structure proper.

A further object of the invention is to provide an improved separable juncture between the top fabric at its lower forward portion and the inside of the body at the belt line whereby no snap fasteners are required on the outside of the body to insure a tight weatherproof joint.

Still another object resides in the provision of an improved separable juncture seal or barrier associated with the lower forward portion of the top fabric extending downwardly within the body and its inner wall adjacent the belt line, whereby the top fabric or material remains inside the body at all times and need not be manually moved to the outside of the body surface to prevent leakage after the top has been raised to the up or elevated position.

Another object of the invention resides in the provision of a collapsible top adapted to permit greater coordination between the styling of the top and body of the vehicle, thus improving the general appearance of vehicles having convertible tops.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a side elevation, partly in section, of a vehicle embodying this invention.

Fig. 2 is a fragmentary top plan view partly in section of the vehicle illustrated in Fig. 1.

Fig. 3 is a fragmentary side view of the auxiliary bow control and locking mechanism illustrated in Fig. 1.

Fig. 4 is a sectional view taken substantially on a line 4—4 of Fig. 1 looking in direction of the arrows.

Fig. 5 is a fragmentary side view of the main bow control mechanism.

Fig. 6 is a sectional view taken substantially on the line 6—6 of Fig. 1 looking in the direction of the arrows.

Figure 7:
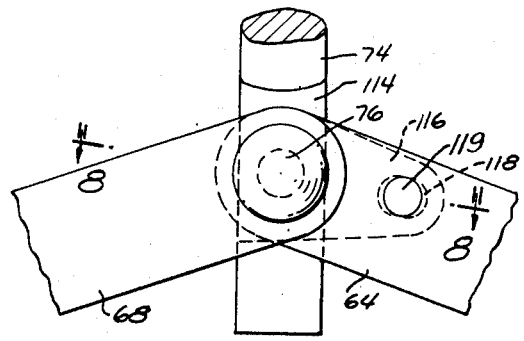
Fig. 7 is a view similar to Fig. 3 showing a modified form of the invention permitting the auxiliary bow to be anchored securely to a bow link.

Before explaining in detail the present invention, it is understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to Fig. 1 it will be observed that a header bar 10 is fixedly secured to a vehicle body. The header bar 10 may be provided with front and top windows to insure good visibility from the driver's compartment of the vehicle.

A front bow 12 to which is secured the fabric or other suitable covering of the top material is carried by front side rails 14 in such a manner as to be rigid therewith. In the description hereinafter, only one side of the top is described, but it will be understood that the other side may be similarly constructed. The rear end of the side rail 14 is connected by a pivot 16 to the forward end of a rear side rail 18, which in turn is connected by a pivot 20 to a folding pillar 22. The pillar 22 is hingedly mounted on a main top pivot 24 carried by a suitable bracket secured to the body of the vehicle.

A rear bow member 25, and a lower power link 26 are pivotally mounted at 28 on a suitable bracket secured to the body of the vehicle. An arm 30 carried by the lower power link 26 is pivotally secured to a reciprocable rod 32 of a power unit 33 by means of a yoke 34 in such a manner that actuation of the power unit 33 oscillates the power link 26 about the pivot 28 to raise and lower the top. The power unit 33 may be actuated in any convenient manner as by compressed air, vacuum, hydraulic or electric power.

In the event the power unit should fail for any reason, the top may be elevated or lowered manually by lifting the front bow and the front side rails. The interconnected links and levers guide the top structure accurately to the header bar 10 as the top is being elevated, and guide it into the storage booth when the top is lowered. The interconnected links and levers may be said to be self-contracting since the framework is so designed and proportioned as to maintain accurate alignment to move the interconnected elements to predetermined positions as the front bow and the front side rails are moved manually or the actuating mechanism moves the main bow carrying members.

An upper power link 36 is secured by means of a pivot 38 to the upper end of the lower power link 26. The opposite end of the upper power link 36 is pivotally secured to an arm 40 carried by the folding pillar 22 as illustrated at 42.

A lower balancing link control member 44 is pivotally mounted to the body as illustrated at 46, and is pivoted to an upper balancing link control member 48 as illustrated at 50. The opposite end of the upper balancing link control member 48 is pivoted at 52 to an arm carried by the folding pillar 22.

A balancing link 54 is pivotally mounted at 56 to an intermediate portion of the lower balancing link control member 44, and is pivoted at its opposite end at 58 to one end of an auxiliary bow control bar 60. The opposite end of the auxiliary bow control bar 60 is pivoted at 62 to an intermediate portion of an auxiliary bow rear link 64 having one end 66 pivoted to an intermediate portion of the rear side rail 18. An auxiliary bow front link 68 is pivoted at 70 to an intermediate portion of the front side rail 14. The front and rear auxiliary bow links 68 and 64 are secured by means of a bolt or pivot pin 76 to a bracket 72 fixed to an auxiliary bow 74 as illustrated more clearly in Figs. 3 and 4. As shown in Fig. 4, the outer portion of the bow slopes downwardly at a considerable angle, and the bracket 72 is secured to the bow at a substantial distance from the end thereof.

The auxiliary rear and front bow links 64 and 68 are provided with stop members 78 and 80 adapted to move into engagement with shoulders 82 and 84 on the bracket 72 when the top is in the up position, and to move into engagement with shoulders 86 and 88 carried by the same bracket 72 when the top is in the down position.

A bracket 90 is fixed to the rear part of the side rail 18 and is connected by a pivot 92 to an intermediate portion of the balancing link 54 as illustrated. A bracket 94 fixed to the folding pillar 22 is pivotally connected at 96 to a main bow supporting bracket 98 carrying a main bow 99 as more clearly illustrated in Figs. 5 and 6.

A quadrant 100 is pivoted at 102 to an intermediate portion of the main bow supporting bracket 98, and is pivoted at its lower end to the bracket 90 on the rear part of the side rail 18 at 104.

The pivots 24, 28 and 46 may be carried by a single bracket secured in the side of the vehicle body.

The operation of this collapsible top is as follows. When the top is in the up position as illustrated in Figs. 1 and 2, it is only necessary to release the locking catches (which may be of the type shown in Ackermans Patent No. 2,486,905, issued November 1, 1949) securing the front bow 12 to the fixed header bar 10, and actuate a control mechanism whereupon the rod 32 of the power unit 33 moves downwardly to oscillate the lower power link 26 about its pivot 28 in the clockwise direction as viewed in Fig. 1. Oscillating movement of the lower power link 26 is transmitted through the upper power link 36 to rotate the folding pillar 22 about the main top pivot 24 in the clockwise direction. Rotation of the folding pillar 22 is transmitted through the lower and upper balancing link control members 44 and 48 and the balancing link 54, auxiliary bow control bar 60, rear and front auxiliary bow links 64 and 68, to move the top to the down position as illustrated in dotted lines in Fig. 1.

It will be noted that when the top is moved to the down or collapsed position it folds into a compartment or booth 106 extending across the back and along the sides of the rear seat of the vehicle. A space 108 is provided beneath a portion of the booth or compartment 106 for the reception of a spare wheel and tire 110, a shelf 112 being provided to separate the compartments 106 and 108.

Attention is directed to the fact that when the top is moved to the down position the main bow 99 moves forwardly and upwardly as indicated in Fig. 5 about the pivot 96 as the quadrant 100 is actuated in the top lowering direction. The main bow moves angularly to a predetermined folded position between the rear bow 25 and the pivot 58 in such a manner that the upper portion of the main bow 99 is maintained out of contact with the rear bow 25 and the shelf 112 to provide suitable clearance and avoid interference with the other elements of the top construction when the top is moved to the down or stored position. This action is obtained by selecting the distance between the pivots 102 and 104 of the quadrant 100 in such a manner that the quadrant 100 exerts a pushing force to move the main bow 99 in the counter-clockwise direction as viewed in Fig. 5, when the lowering action of the top starts, and this pushing force is reversed in such a manner that the quadrant 100 exerts a tensioning or pulling force as the pivot 104 operating on the smaller arc passes under the pivot 102 pivoting about a larger arc as illustrated in Fig. 5. The exact position of the main bow 99 in the booth or compartment 106 can thus be accurately determined by proper selection of the points 102 and 104 with relation to the length of the quadrant 100 to insure easy storage of the top in the booth or compartment 106.

Attention is also directed to the fact that the auxiliary bow 74 is maintained in a predetermined angular relation relative to the side rails 14 and 18, both when the top is in the up and in the down positions.

The stop members 78 and 80 carried by the links 64 and 68 contact the stop shoulders 82 and 84 on the auxiliary bow bracket 72 as illustrated in Figs. 1 and 3 when the top is in the up position to maintain the auxiliary bow 74 in a substantially vertical position.

During the time when the top is being moved to the down position the auxiliary bow 74 is free to move angularly about the pivot 76 under the influence of the force exerted by the tension members 134 secured to the spaced bows, or the force exerted by the top material, or by the padding strips 136. One of these forces may be employed individually or they may all act concurrently. As the top approaches the down position illustrated in dotted lines in Fig. 1 the stop members 78 and 80 carried by the links 64 and 68 contact the stop shoulders 86 and 88 of the auxiliary bow bracket 72 to force the auxiliary bow 74 to occupy a substantially horizontal position between the side rails 14 and 18. The auxiliary bow is thus maintained in a non-obstructing position, and the top is folded in such a manner as to occupy minimum space in the booth or compartment 106. If the position of the auxiliary bow were not controlled it would move angularly to an obstructing position by the force of gravity and occupy a substantially vertically downwardly directed position or be pulled upwardly by the top fabric etc. thereby preventing compact folding of the top mechanism.

Figure 8:
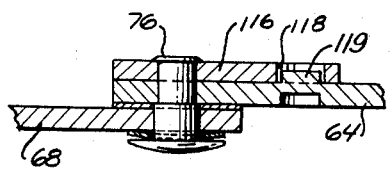
Fig. 8 is a sectional view taken substantially on the line 8—8 of Fig. 7 looking in the direction of the arrows.

Figs. 7 and 8 illustrate a modified form of auxiliary bow actuating mechanism. The auxiliary bow 74 is secured to a bracket 114 having an arm 116 extending in parallel and contacting relation to the auxiliary bow rear link 64 and having a hole or elongated slot 118 for the reception of a boss or pin 119 carried by the link 64.

This type of auxiliary bow controlling mechanism is advantageous in some types of folding tops where it is desirable to maintain the auxiliary bow in a substantially fixed predetermined angular position relative to one of the links 64 or 68. With this construction when the top is moved to the collapsed or down position the auxiliary bow 74 is maintained in substantially the same angular relation relative to the link 64 as it oscillates about the pivot 76 when moving between the up and down positions. With this construction it is necessary that only one of the links 64 or 68 be provided with a stop since the other link will move its associated side rail proportionately to the movement of the auxiliary bow 74.

Figure 9:
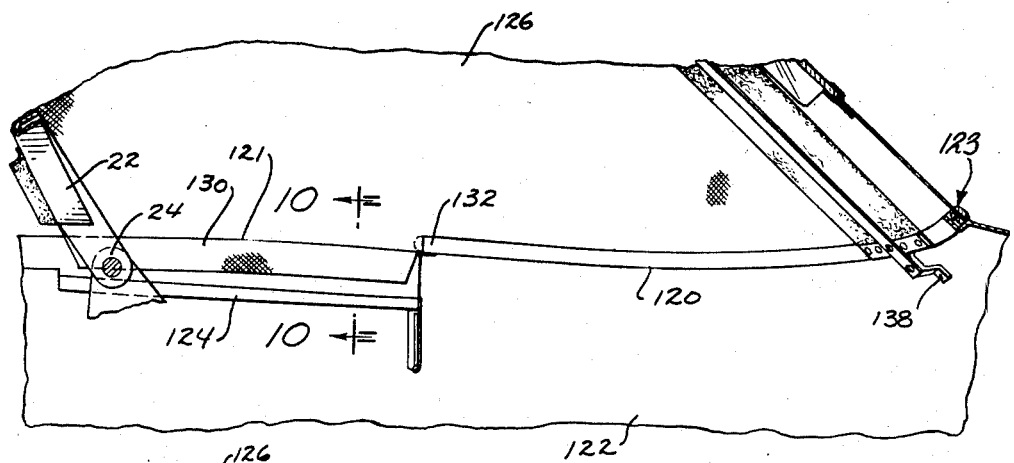
Fig. 9 is a fragmentary side view of a portion of the top showing the belt rail.
Figure 10:
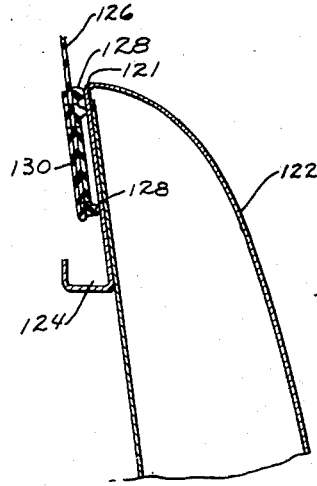
Fig. 10 is a sectional view taken substantially on the line 10—10 of Fig. 9 looking in the direction of the arrows.

Figs. 9 and 10 illustrate my improved construction for pressing the fabric of the folding top to the inside of the vehicle body in such a manner that the top material will be maintained in a predetermined position at all times when the top is up. The belt line of the body is indicated by the lines 120, 121 at the rear and forward portions respectively of the body, the line 120 being the lower edge of the belt molding 132, which serves to secure the lower edge of the rear portion of the top material 126 permanently in place, as indicated at 123 in Fig. 9. The line 121 represents the upper edge of the body panel 122, and the top material is not secured thereto, but is so arranged that it will fit snugly against the inner surface of the panel 122 when the top is in raised position. A trough 124 is provided to carry away water seeping through the juncture between the top and the body.

As illustrated, the top material 126 formed of fabric or any other suitable material is provided with seals 128 in the form of fins to contact the inner edge of the body at and below the belt line 121 to minimize the seepage of water through the juncture between the top and the body of the vehicle.

The lower forward portion of the top material is folded or reinforced with a weather-stripping section 130 having the seals 128 carried thereby. With this construction the top material having the weather-stripping section 130 attached thereto will be maintained in contact with the body at and below the belt line 121 when the top is up, and as the top has been moved to the final up position it will be unnecessary to manually lift the top material over the belt line 121 as is the case in many previous designs. In this manner a more workmanlike construction is provided, and longer life of the top is insured because it is not subjected to strains and distortions. The top material 126 is secured to the folding pillar 22 in such a manner that when the top is in the up position the portion between the belt molding 132 and the folding pillar is maintained under tension through the force exerted by the forward pull of the pillar.

Means are provided to maintain the top mechanism taut at all times, and to position each of the top carrying bows in a substantially predetermined position relative to the other portions of the top mechanism.

One desirable form of design includes tension members 134 interposed between the bows and padding 136 or incorporated in the padding 136. One end of each of the tension members is secured to the body of the vehicle as illustrated at 138, and the other end is secured to the front bow 12.

The tension members are preferably provided at spaced points transversely of the top and extend from the front to the rear thereof. The tension members are secured to the rear bow 25, the main bow 99 and the auxiliary bow 74 in such a manner as to insure a predetermined position of each bow relative to the other bows when the top is in the up position. When the top is being elevated the force required to move the top to the taut position is carried through the tension members 134, and it is therefore unnecessary to subject the top material or the padding to tensioning strains that would stretch them out of shape to permit them to loosen up.

As the top moves to the down position the tension members 134 move with the top material, and assume the folded position. The tension members 134 are preferably formed of relatively resilient non-stretchable material capable of transmitting considerable force, such for example as strips of steel ribbon or other material possessing the desired properties enumerated above.

I claim:

1. A main bow actuating mechanism for a folding top for a motor vehicle comprising a folding pillar, a bracket secured to the folding pillar, a side rail, a bracket secured to the side rail, main pivotal connecting means between both brackets, a main bow having an extension pivotally mounted on the upper end of the first mentioned bracket, and a quadrant pivotally connected to the extension and to the second mentioned side rail bracket at a point behind the main pivotal connection of both brackets, whereby when the top is in the up position the main bow is held in a predetermined position, and whereby the main bow is induced to move counterclockwise about its extension's pivot when moving to the predetermined down position in the booth.

2. In a folding top for a motor vehicle having a booth, a folding pillar having an upper extension, a side rail having a rearward extension, a main pivot between the pillar and the side rail below the upper end of the pillar extension and forward of the side rail extension's rear end pivot, a main bow bracket pivotally connected to the upper end of the pillar extension, an upper pivot on said bracket, and intermediate pivot between the main pivot and forward of the side rail extension's end pivot, and a quadrant between the intermediate pivot in the side rail extension and the upper pivot of the main bow bracket, said quadrant moving the main bow gradually counterclockwise, when the top is being lowered, to a substantially horizontal position in the booth to clear other folding top elements.

3. In a folding top for a motor vehicle, a folding pillar, a bracket fixed to the folding pillar, a side rail, a bracket fixed to the said rail, a main pivot connecting said brackets, a main bow having an extension bracket pivotally mounted on the upper end of the first mentioned bracket above said main pivot, a quadrant pivotally connected to the bow extension bracket and connected to the second mentioned bracket at a point spaced from the main pivot, whereby while the pillar is moving to a folding position the quadrant will move the main bow counterclockwise to position the main bow in a predetermined location.

4. In a motor vehicle comprising a body having a substantially vertical inner side wall terminating in a longidudinal belt line; a folding top comprising flexible top material having its lower rear edge secured to said body adjacent said belt line and having forwardly of said rear edge a flap extending within said body to a lower level than the belt line and forming a juncture with said inner wall, means for impeding flow of water past said juncture comprising a flexible weatherstrip secured to said flap and provided with an outwardly extending lateral fin, a folding pillar hinged to said body below said belt line and secured to and exerting forward tension on the lower front portion of said top material so that said fin is pressed against the side wall when the top is in the up position, and a trough within said body so aligned below said juncture that any leakage of water therethrough is received and carried off by said trough.

5. In a motor vehicle comprising a body having a substantially vertical inner side wall terminating in a longitudinal belt line; a folding top comprising flexible top material having its lower rear edge secured to said body adjacent said belt line and having forwardly of said rear edge a flap extending within said body to a lower level than the belt line and forming a juncture with said inner wall, means for impeding flow of water and air past said juncture comprising a lateral cushion associated with said flap, a folding pillar hinged to said body below said belt line and secured to and exerting forward tension on the lower portion of said top material so that said cushioned flap is pressed against the inner side wall when the top is in the up position, and a trough within said body below said juncture to receive leakage of water therethrough.

6. In a vehicle body having a side structure terminating at its upper edge in a substantially horizontal belt line; a folding top including flexible top material secured to a portion of said body adjacent said belt line and having forwardly of said portion a prolongation of said material extending downwardly within the body, said prolongation being formed with a lateral cushion coacting with an inner upper part of said structure to form a water-shedding juncture, a folding top pillar hinged to said body and secured to and exerting longitudinal forward tension on the lower front portion of said top material when the top is up to force said cushion into contact with said inner upper part of said structure.

7. In a vehicle body having a side structure terminating in a belt line; a folding top comprising flexible top material having the rear portion of its lower edge secured to the body adjacent the belt line and having the forward portion of said lower edge forming a prolongation of said material extending downwardly within the body below the belt line, a lateral cushion carried by said prolongation, a folding pillar hinged to said body and secured to said top material to exert forward pull thereon and press said cushion against an inner upper part of said side structure when the top is in the up position.

8. A vehicle body having an inner side wall terminating in a belt line and a folding top comprising flexible top material having its lower rear edge secured to a portion of said body adjacent said belt line and having forwardly of said portion a prolongation of said material extending downwardly within said body, a folding pillar hinged to said body, said material being secured to said pillar, and a cushion associated with said prolongation and inner wall when said top is in raised position and forming a separable weatherproof juncture adjacent said belt line permitting said top being put in lowered position.

9. A vehicle body having an inner side wall terminating in a belt line and a folding top comprising flexible top material having its lower rear edge secured to a portion of said body adjacent said belt line and having forwardly of said portion a prolongation of said material extending downwardly within said body, a folding pillar hinged to said body, said material being secured to said pillar, and a cushion associated with said prolongation and inner wall when said top is in raised position and forming a separable weatherproof juncture adjacent said belt line permitting said top being put in lowered position, said downwardly extending prolongation remaining within said body in the raised and lowered positions of said top and thus leaving said belt line exposed as viewed from outside said body.

10. A vehicle body having an inner side wall terminating in a belt line and a folding top comprising flexible top material having its lower rear edge secured to a portion of said body adjacent said belt line and having forwardly of said portion a prolongation of said material extending downwardly within said body, a folding pillar hinged to said body, said material being secured to said pillar, and a cushion associated with said prolongation and inner wall when said top is in raised position and forming a separable weatherproof juncture adjacent said belt line permitting said top being put in lowered position, the force exerted by the forward pivoting of said pillar being used to close said juncture when said top is in raised position.

11. A vehicle body having an inner side wall terminating in a belt line and a folding top comprising flexible top material having its lower rear edge secured to a portion of said body adjacent said belt line and having forwardly of said portion a prolongation of said material extending downwardly within said body, a folding pillar hinged to said body, said material being secured to said pillar, and a cushion associated with said prolongation and inner wall when said top is in raised position and forming a separable weatherproof juncture adjacent said belt line permitting said top being put in lowered position, the force exerted by the forward pivoting of said pillar being used to close said juncture when said top is in raised position, and a trough within said body to receive leakage of said juncture.

12. A vehicle body having an inner side wall terminating in a belt line and a folding top comprising flexible top material having its lower rear edge secured to a portion of said body adjacent said belt line and having forwardly of said portion a prolongation of said material extending downwardly within said body, a folding pillar hinged to said body, said material being secured to said pillar, and a cushion associated with said prolongation and inner wall when said top is in raised position and forming a separable weatherproof juncture adjacent said belt line permitting said top being put in lowered position, said downwardly extending prolongation remaining within said body in the raised and lowered positions of said top and thus leaving said belt line exposed as viewed from outside said body, the force exerted by the forward pivoting of said pillar being used to close said juncture when said top is in raised position, and a trough within said body to receive leakage of said juncture.

13. In a folding top for a vehicle having a side window, two frame members pivotally connected end-to-end and forming a folding side rail conforming when the top is up to the upper edge of said window, a transverse roof bow normally disposed in a substantially vertical plane and having a downwardly sloping outer portion, a bracket fixed to said bow at a point spaced substantially inwardly from the end of the bow and extending downwardly from said point, a pivot pin carried by said bracket, a link connected to said bracket by said pivot pin and pivotally connected to one of said frame members, a second link pivotally connected to the other of said frame members and pivotally attached to said bracket by said pivot pin, an arm fixedly related to said bracket, and interengaging means on said first link and said arm detachably connecting the two together to prevent angular movement therebetween and thereby maintain said bracket and bow in predetermined angular relation to said first link, said pivot pin, bracket, arm, and interengaging means constituting the sole attaching means between said bow and said links.

14. In a folding top for a vehicle having a side window, two frame members pivotally connected end-to-end and forming a folding side rail conforming when the top is up to the upper edge of said window, a transverse roof bow normally disposed in a substantially vertical plane and having a downwardly sloping outer portion, a bracket fixed to said bow at a point spaced substantially inwardly from the end of the bow and extending downwardly from said point, a pivot pin carried by said bracket, two links each pivotally connected to one of said frame members and pivotally attached to said bracket by means of said pivot pin, and coacting stop members on said links and said bracket operative at least when the top is in the up position for maintaining said bow in a substantially vertical plane while permitting the bow to rotate relative to the links while the top is being raised or lowered.

15. In a vehicle body of the type having upper and lower sections delimited by a belt line; a door hingedly mounted on one side of the body and including a slidable window and a rotatable window located forwardly of the slidable window, said windows having adjacent rectilinear edges, a fixed windshield assembly having a rearward extension forming the forward portion of a roof, and a top forming the rear portion of the roof and movable to a down position within the rear portion of said lower section and to an up position in abutting relation to said extension to form therewith a juncture aligned with said edges, said top including side rails and constituting the sole connection above the belt line between said extension and the rear portion of said lower section, said extension forming a support for the forward end of said top when the latter is in up position.

16. In a motor vehicle body of the type having upper and lower sections delimited by a belt line; a door hingedly mounted on one side of the body and including a slidable window and a rotatable window located forwardly of the slidable window, a frame for one of said windows fixed to the door and having a rectilinear edge abutting an edge of the other window, a fixed windshield assembly including corner posts and a rearward extension forming the forward portion of a roof, and a top forming the rear portion of the roof and movable to a down position within the rear portion of said lower section and to an up position in abutting relation to said extension to form therewith a generally rectilinear juncture aligned with said edges, said top including side rails and constituting the sole connection above the belt line between said extension and the rear portion of said lower section, said extension forming a support for the forward end of said top when the latter is in up position.

17. In a motor vehicle body of the type having upper and lower sections delimited by a belt line; a door opening in one side of said body, a door therein including a slidable window and a rotatable window located forwardly of the slidable window, said windows having adjacent rectilinear edges, a fixed windshield assembly forming a forward portion of said door opening and including a rearwardly extending header panel shaped to deflect windstream and terminating in substantial alignment with said edges, and a collapsible top movable to a down position within the rear portion of said lower section and to an up position in abutting relation to said extension and constituting the sole connection above the belt line between said extension and the rear portion of said lower section.

18. In a motor vehicle body of the type having upper and lower sections delimited by a belt line; a door opening in one side of said body, a door mounted in said opening and including a slidable window and a rotatable window located forwardly of the slidable window, said windows having adjacent abutting edges, a fixed windshield assembly forming a forward portion of said door opening and including a rearward extension forming a portion of a roof and terminating in alignment with said edges, a hooded covering forming the remainder of said roof and constituting the sole connection above the belt line between said extension and the rear portion of said lower section, and means for securing the forward edge of said covering to the rear edge of said extension.

JOHN W. J. ACKERMANS.

REFERENCES CITED

The following references are of record in the file of this patent:

UNITED STATES PATENTS

| Number | Name | Date |
| --- | --- | --- |
| 381,944 | Mortz | May 1, 1888 |
| 876,768 | Bowen | Jan. 14, 1908 |
| 1,014,553 | Zellers | Jan. 9, 1912 |
| 1,173,380 | Pease | Feb. 29, 1916 |
| 1,177,944 | Freeman | Apr. 4, 1916 |
| 1,211,107 | Dorl | Jan. 2, 1917 |
| 1,447,191 | Vetter | Mar. 6, 1923 |
| 1,748,736 | Selje | Feb. 25, 1930 |
| 1,826,426 | Ledwinka | Oct. 6, 1931 |
| 1,884,441 | Welch | Oct. 25, 1932 |
| 1,952,252 | Heuser | Mar. 27, 1934 |
| 2,040,680 | Westrope | May 12, 1936 |
| 2,076,243 | Marshall et al. | Apr. 6, 1937 |
| 2,128,849 | Redfern | Aug. 30, 1938 |
| 2,184,537 | Valletta | Dec. 26, 1939 |
| 2,257,951 | Haberstump | Oct. 7, 1941 |
| 2,267,471 | Keller | Dec. 23, 1941 |
| 2,376,949 | Westrope | May 29, 1945 |
| 2,382,635 | Humer | Aug. 14, 1945 |
| 2,447,059 | Eaton et al. | Aug. 17, 1948 |
| 2,448,054 | Seckel | Aug. 31, 1948 |

FOREIGN PATENTS

| Number | Country | Date |
| --- | --- | --- |
| 6,851 | Great Britain | 1915 |
| 21,124 | Great Britain | 1913 |
| 236,742 | Great Britain | July 16, 1925 |
| 249,966 | Italy | Aug. 27, 1926 |
| 312,281 | Great Britain | Apr. 17, 1930 |
| 782,875 | France | June 14, 1935 |